US012436215B2

(12) United States Patent
Sukkau et al.

(10) Patent No.: US 12,436,215 B2
(45) Date of Patent: Oct. 7, 2025

(54) SHIM APPARATUS, METHOD FOR USING THE SHIM APPARATUS AND MR APPARATUS

(71) Applicant: Siemens Healthineers AG, Forchheim (DE)

(72) Inventors: Johann Sukkau, Herzogenaurach (DE); Andrew Dewdney, Neunkirchen am Brand (DE); Michael Leigart, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 278 days.

(21) Appl. No.: 18/187,762

(22) Filed: Mar. 22, 2023

(65) Prior Publication Data
US 2023/0324483 A1    Oct. 12, 2023

(30) Foreign Application Priority Data

Mar. 25, 2022   (DE) ...................... 10 2022 202 954.2

(51) Int. Cl.
*G01R 33/3873* (2006.01)
*G01R 33/07* (2006.01)

(52) U.S. Cl.
CPC ......... *G01R 33/3873* (2013.01); *G01R 33/07* (2013.01)

(58) Field of Classification Search
CPC .. G01R 33/3873; G01R 33/07; G01R 33/243; G01R 33/072; G01R 33/00; G01R 33/02; G01R 33/3802; A61B 5/055; G01B 11/02
See application file for complete search history.

(56) References Cited

U.S. PATENT DOCUMENTS

| 2012/0147462 A1* | 6/2012 | Seifert | G02B 21/26 359/392 |
| 2015/0309300 A1* | 10/2015 | Higaki | G02B 21/367 348/79 |

(Continued)

FOREIGN PATENT DOCUMENTS

| CN | 113476030 B | * | 2/2024 | ............. A61B 5/055 |
| DE | 102016203255 A1 | | 8/2017 | |
| DE | 102020211327 A1 | | 3/2022 | |

OTHER PUBLICATIONS

Tovar, D. A. et al.: "A rotational cylindrical fMRI phantom for image quality control"; Plos one, DOI: https://doi.org/10.1371/journal.pone.0143172; 2015.

(Continued)

*Primary Examiner* — Lee E Rodak
*Assistant Examiner* — Zannatul Ferdous
(74) *Attorney, Agent, or Firm* — Harness, Dickey & Pierce, P.L.C.

(57) ABSTRACT

According to one or more example embodiments, a shim apparatus for an MR apparatus includes a specimen holder, the specimen holder including a plurality of MR reference specimens, the MR reference specimens being on the specimen holder; a frame; a shaft, the shaft being mounted on the frame such that the shaft is rotatable about an axis of rotation, the specimen holder being non-rotatably connected to the shaft, the MR reference specimens being spaced apart from the axis of rotation; a drive unit, the drive unit being configured to output a torque, the drive unit being electrical or pneumatic; and a gear unit, the gear unit being configured to transfer the torque output by the drive unit to the shaft and to rotate or swivel the MR reference specimens about the axis of rotation.

18 Claims, 7 Drawing Sheets

(56) References Cited

U.S. PATENT DOCUMENTS

| | | | |
|---|---|---|---|
| 2016/0047876 A1* | 2/2016 | Alhamud | G01R 33/56563 |
| | | | 324/309 |
| 2017/0090001 A1* | 3/2017 | Feiweier | G01R 33/565 |
| 2017/0153308 A1* | 6/2017 | Buchenau | G01R 33/56563 |
| 2017/0248665 A1 | 8/2017 | Dewdney et al. | |
| 2017/0333021 A1* | 11/2017 | Heiges | A61B 17/3423 |
| 2020/0271736 A1* | 8/2020 | Han | G01R 33/3875 |
| 2022/0071564 A1 | 3/2022 | Sukkau et al. | |

OTHER PUBLICATIONS

Elster, Allen D.: "Shimming—What is shimming and why is it needed?"; Questions and Answers in MRI, URL: https://www.mriquestions.com/why-shimming.html; Dec. 10, 2022.

* cited by examiner

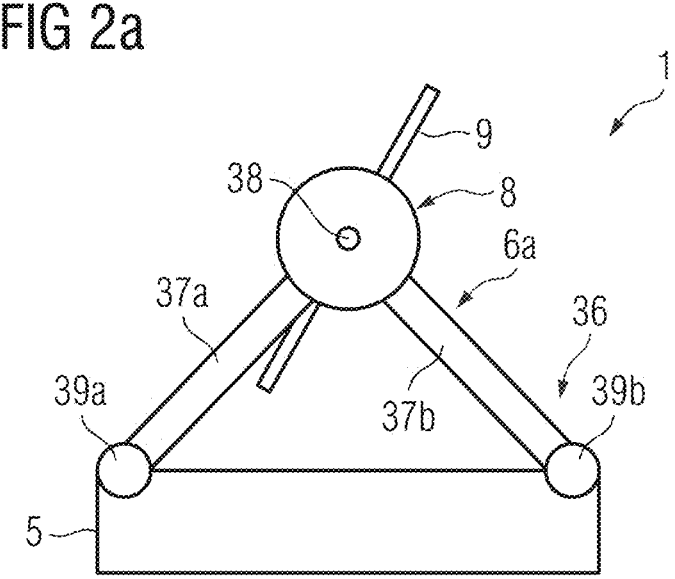
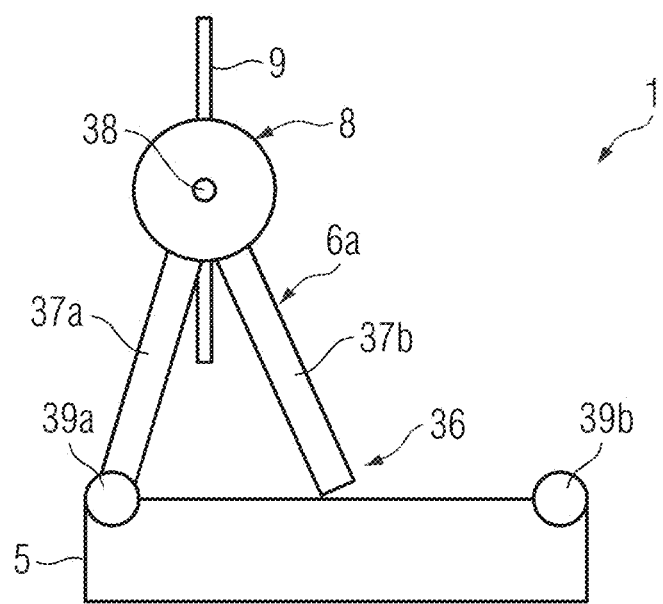

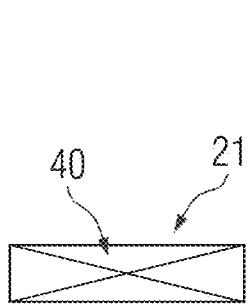
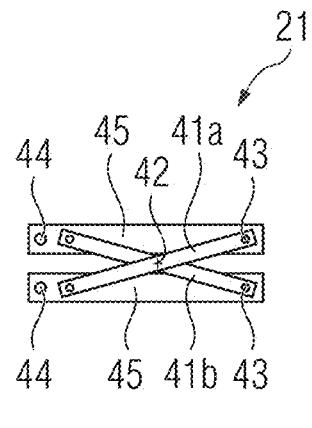
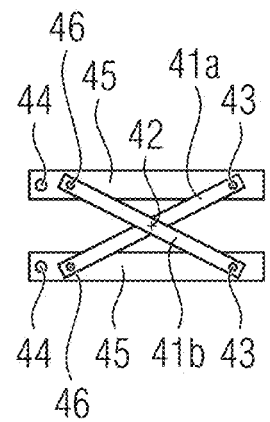
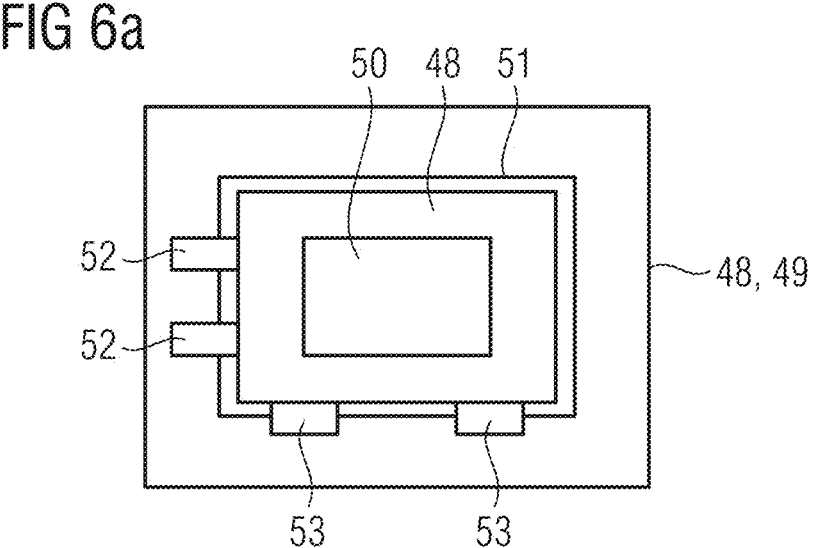
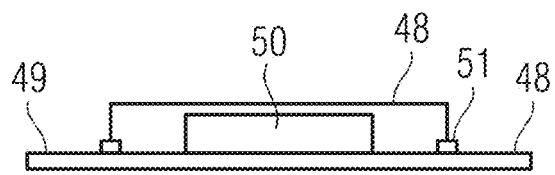

SHIM APPARATUS, METHOD FOR USING THE SHIM APPARATUS AND MR APPARATUS

CROSS-REFERENCE TO RELATED APPLICATION(S)

The present application claims priority under 35 U.S.C. § 119 to German Patent Application No. 10 2022 202 954.2, filed Mar. 25, 2022, the entire contents of which are incorporated herein by reference.

FIELD

One or more example embodiments of the present invention relates to a shim apparatus for an MR apparatus for adjusting a magnet shim of the MR apparatus.

RELATED ART

MR apparatuses are used for imaging in the medical sector. The examination object, for example a patient, is exposed to a static magnetic field, which is also called the B0 field. The static magnetic field orients the nuclear spins in the examination object, in particular in the patient. The static magnetic field is overlaid with gradient fields, which serve for spatial encoding. An RF pulse is then interspersed in the examination object, with the RF pulse effecting an excitation and a flip of the nuclear spins. The excited nuclear spins then return to the lower energy state and the orientation specified by B0. An MR signal is emitted by the relaxation process and is received by the MR apparatus and is processed for imaging.

The quality of an MR scan, in particular of an MR image, depends greatly on the characteristics of the magnetic fields used, in particular B0, gradient fields and B1. The homogeneity of the magnetic fields has a great influence. The magnetic fields in an MR apparatus have different interferences. These can be due to both production (field magnet, coils, electronic devices), as well as due to the environment. What are known as shims are used to compensate inhomogeneities in the magnetic fields. The shims or shimming of an MR apparatus should be checked, adjusted and/or re-set, in particular following installation, maintenance, renovation or relatively long operating periods. Shim apparatuses can be used for this.

For example, shim apparatuses are known, which can be positioned in a patient tunnel of the MR apparatus and comprise reference specimens on a rotatable specimen wheel. The same shim apparatuses are also referred to as shim arrays and due to their stable construction are heavy, large and unwieldy.

For example, the known shim apparatuses have a disk with the MR specimens, with the disk having to be manually rotated and locked. In order for the positions to reproducibly stay at exactly specified locations in the case of this manual rotation, the shim apparatus has to have a solid and rigid construction. In addition, it has been ascertained in tests that a ring made of metal or aluminum is required perpendicular to the axis of rotation in order for the axis of rotation to retain its position. Owing to these measures the known shim apparatuses are frequently more than 25 kg in weight. In addition, the known shim apparatuses have the drawback that on a displacement of the shim apparatus along the Z-axis of the magnet, eddy currents are induced in both the aluminum ring and in the RF shield of the multiplexer, and these counter the direction of movement and thus slow down the positioning movement.

A further problem of the known shim apparatuses manifests itself in a centering of the shim apparatus in the isocenter of the MR apparatus. The Z-position of the MR specimens is ascertained with the aid of gradients at the beginning of the magnet shimming and a Z-delta between the center of the shim apparatus and the isocenter calculated therefrom. The service technician is then given corresponding indications to displace the shim apparatus along the Z-axis by a certain number of millimeters. The service technician has no further aids at this point, however (such as a ruler with mm graduation on the inside of the patient tunnel), using which he can exactly adhere to the specified displacement. She/he has to estimate and implement this distance by eye. At higher field strengths ($>=7T$) yet another safety aspect is added because it can be dangerous for the service technician to place his head in the patient tunnel. The shim apparatus for such field strengths has to be modified accordingly for manual rotation. Thus, for example, appropriate extension rods can be provided for manual rotation. The overall size of such shim apparatuses does not permit transportation in a conventional car.

SUMMARY

One or more example embodiments of the present invention eliminate the problems and drawbacks of the known shim apparatuses illustrated above. One or more example embodiments of the present invention provide an inventive shim apparatus, the method for using the shim apparatus and the MR apparatus having the shim apparatus.

According to one or more example embodiments, a shim apparatus for an MR apparatus includes a specimen holder, the specimen holder including a plurality of MR reference specimens, the MR reference specimens being on the specimen holder; a frame; a shaft, the shaft being mounted on the frame such that the shaft is rotatable about an axis of rotation, the specimen holder being non-rotatably connected to the shaft, the MR reference specimens being spaced apart from the axis of rotation; a drive unit, the drive unit being configured to output a torque, the drive unit being electrical or pneumatic; and a gear unit, the gear unit being configured to transfer the torque output by the drive unit to the shaft and to rotate or swivel the MR reference specimens about the axis of rotation.

According to one or more example embodiments, the specimen holder is planar and defines a specimen holder plane, the axis of rotation is perpendicular to the specimen holder plane, the MR reference specimens each have a spacing from the axis of rotation and at least one of rotation or swiveling of the MR reference specimens forms a movement along an arc with radius about the axis of rotation, the spacing and the corresponding radius for each reference specimen being the same.

According to one or more example embodiments, the gear unit comprises a toothed belt, wherein the toothed belt connects the drive unit to the shaft for transfer of the torque.

According to one or more example embodiments, the drive unit comprises an electric motor, wherein the electric motor is configured to operate in an external magnetic field and has a motor axis of rotation, wherein the motor axis of rotation is transverse to the axis of rotation of the shaft.

According to one or more example embodiments, the gear unit comprises a deflection gear, wherein the deflection gear is configured to deflect the torque output by the drive unit into a torque about an axis in the same direction as the axis of rotation of the shaft.

According to one or more example embodiments, the frame has a base section and two shoulder sections, the shoulder sections each have a bearing point, the shaft is rotatably mounted in the bearing points, a working state and a transportation state is assumed by the shim apparatus, the shoulder sections in the working state space the shaft apart from the base section, and at least one of the specimen holder or the shaft are on the base section in the transportation state.

According to one or more example embodiments, the shoulder sections have a first shoulder arm and a second shoulder arm, wherein the first shoulder arm is rotatably connected to the base section at a folding point, the second shoulder arm is connected to the base section at the folding point in the working state and the connection of the second shoulder arm to the base section at the folding point is released in the transportation state.

According to one or more example embodiments, the shim apparatus further includes a cover module, wherein the cover module includes a light metal or a fiber-reinforced plastic and is configured to form a housing section for the specimen holder in the transportation state and form a support for the frame in the working state.

According to one or more example embodiments, the shim apparatus is oriented along a Z-coordinate axis in the working state, wherein the Z-coordinate axis is in a same direction as a static magnetic field of the MR apparatus, the shim apparatus comprises an evaluation unit, and a magnetic field sensor at a fixed spacing from the specimen holder, the magnetic field sensor is configured to determine a magnetic field, the evaluation unit is configured to determine, based on the determined magnetic field and a characteristic magnetic field curve of the MR apparatus, an offset between the specimen holder and an isocenter of the MR apparatus.

According to one or more example embodiments, the shim apparatus further includes a feedback unit configured to optically or acoustically output at least one of size information or direction information with respect to the offset.

According to one or more example embodiments, the specimen holder comprises a magnetic field sensor, the magnetic field sensor of the specimen holder is configured to ascertain a magnetic field in a region of the specimen holder, and a control unit is configured to at least one of regulate or control the drive unit based on of the magnetic field in the region of the specimen holder.

According to one or more example embodiments, the shim apparatus further includes an encoder unit, wherein the encoder unit is configured to ascertain an angular position of the specimen holder with respect to the axis of rotation, and a control unit is configured to actuate the drive unit based on the ascertained angular position.

According to one or more example embodiments, the shim apparatus further includes a locking facility having a locking pin, wherein the specimen holder has locking recesses in a circumferential direction around the axis of rotation, and the locking facility is configured to latch the locking pin in the locking recess to lock the specimen holder in a locking position.

According to one or more example embodiments, a method for operating the shim apparatus includes assuming the shim apparatus in a working state, the shim apparatus being in a patient tunnel of an MR apparatus; actuating the drive unit to output the torque, the torque being transferred via the gear unit from the drive unit to the shaft; and at least one of rotating or swiveling the specimen holder during at least one of (i) operation of the MR apparatus or (ii) during MR scans.

According to one or more example embodiments, an MR apparatus for capturing MR data of a patient includes the shim apparatus according to one or more example embodiments, wherein the shim apparatus is configured to be displaceably in a patient tunnel of the MR apparatus in a direction of a B0 field.

BRIEF DESCRIPTION OF THE DRAWINGS

Advantages, effects and embodiments can be found in the accompanying figures and their description. In the drawings:

FIGS. 5a, b, c show a cover module according to one or more example embodiments of the present invention;

FIGS. 6a, b show an RF shield for a multiplexer according to one or more example embodiments of the present invention.

DETAILED DESCRIPTION

Figure 1:
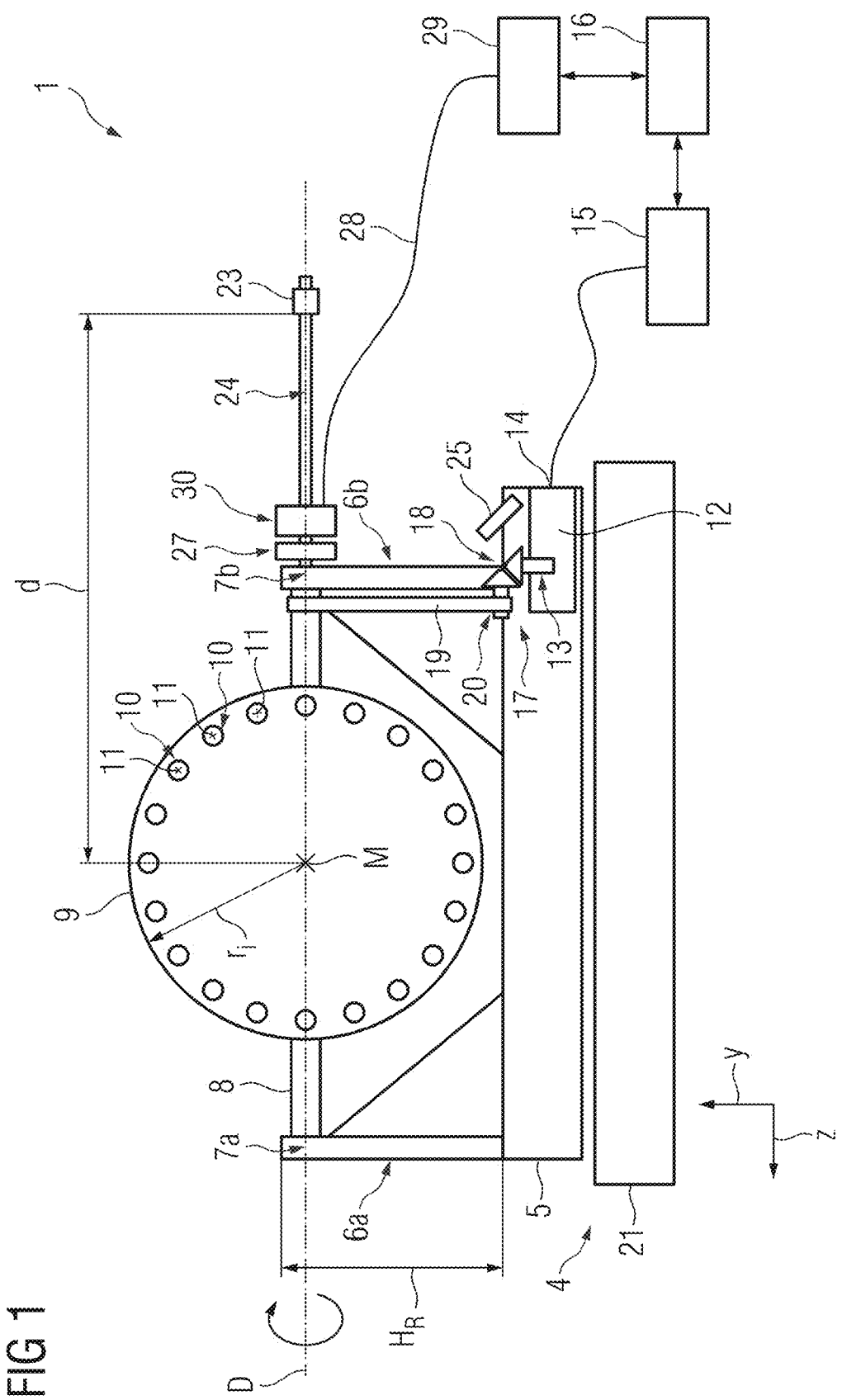
FIG. 1 shows a side view of a shim apparatus according to one or more example embodiments of the present invention.

A shim apparatus is proposed. The shim apparatus is designed for use in and/or with an MR apparatus. For example, the shim apparatus is placed for this purpose in a measuring area, for example patient tunnel, and an MR scan and/or MR measurement data is captured by the shim apparatus. The shim or the fields of the MR apparatus can thus be adjusted on the basis of the MR scan and/or the MR measurement data and knowledge of the shim apparatus. The MR apparatus is designed, in particular, as a magnetic resonance imaging system and comprises a patient tunnel, also called a core. The shim apparatus is designed, in particular, for positioning, displacement, movement and/or securing in the patient tunnel. The shim apparatus is shaped and/or dimensioned accordingly for this. In particular, the MR apparatus defines a Z-direction, with the Z-direction being oriented, for example, in the direction of a patient tunnel. The Z-axis is oriented, in particular, in the direction of the preferred direction of the B0 field. The shim apparatus is designed, for example, to be able to be displaceably arranged in the direction of the Z-direction.

The shim apparatus comprises a specimen holder. The specimen holder comprises a plurality of MR reference specimens. Alternatively, the plurality of MR reference specimens is assigned to the specimen holder and/or arranged on it. For example, the specimen holder comprises at least five and, in particular, at least twelve MR reference specimens. The MR reference specimens are each arranged, secured and/or positioned at reference positions. The MR reference specimens are connected, for example with positive fit, non-positive fit and/or with a material bond, to the specimen holder, in particular a base body of the specimen holder.

The specimen holder is preferably planar in design and/or comprises a planar base body. For example, the specimen holder and/or the base body is designed as a disk, as a circle or as a wheel. The specimen holder and/or the base body can have a full-surface design, alternatively recesses in the material can be provided. The base body and/or the specimen holder is designed, in particular, to be rigid. Particularly preferably, the specimen holder and/or the base body forms a circular disk. The base body is preferably made from a plastic, in particular a graphene fiber-reinforced plastic, a non-magnetic metal, and/or a non-magnetic composite material.

The reference positions are distributed, in particular, over the specimen holder, in particular the base body. Particularly preferably, the reference positions are arranged equidistantly and/or at equal angular intervals. For example, the axis of rotation is defined perpendicularly with respect to a flat extension of the specimen holder and/or of the base body, with the reference positions, for example in the circumferential direction, being arranged on the base body around the reference axis. The MR reference specimens are, in particular, MR-active specimens and/or have a marked contrast to the environment and/or the specimen holder. For example, the MR reference specimens comprise or form a liquid, a gel, a foam, a plastic or s silicon, which is itself MR-active and/or is mixed with an MR-active substance, for example a salt. In particular, the MR reference specimens have different designs, for example they have different volumes, shapes and/or MR activities. In particular, the concentrations of the MR-active substances and/or salts differ between the MR reference specimens of the shim apparatus.

The shim apparatus comprises a frame and a shaft. The frame forms, in particular a stand, a gantry and/or a support for the shaft. The frame is preferably cuboidal. The frame has a longitudinal extension, wherein when the shim apparatus is used, the longitudinal extension is in the same direction as the preferred direction of the B0 field. The stand comprises, for example, a base section, in particular as a base plate, and side sections, in particular a front and a back side section. The frame can also have two side sections. The side sections can be designed as side walls, in particular as full-surface and/or continuous walls, or alternatively as grid-like walls or walls with recesses.

The shaft is received or mounted on or in the frame so as to rotate about an axis of rotation. The axis of rotation is, in particular, in the same direction as the longitudinal extension of the frame and/or as the preferred direction of the B0 field. For this, the front and back side sections can comprise a bearing and rotatably receive the shaft. The shaft is rod-shaped and forms, for example, a spindle. Preferably, the shaft is made of a metal, in particular a non-magnetic metal. Alternatively, the shaft can be made from a plastic.

The specimen holder is non-rotatably connected to the shaft. For example, specimen holder and shaft can together form a one-piece element. The specimen holder can be connected to the shaft with a material fit, for example by gluing, soldering or welding, with non-positive fit and/or positive fit, moreover. The specimen holder is in particular attached to and/or positioned on the shaft such that it is arranged between the bearings, support points and/or the front and back side walls of the frame. Particularly preferably, the specimen holder is attached to and/or positioned on the shaft such that it is located centrally between the bearings, the longitudinal extension of the frame or the front and back side walls. The MR reference specimens and/or the reference positions are spaced apart from the axis of rotation or the shaft. The spacing between the axis of rotation and MR reference specimen or reference position is also referred to as the specimen spacing ri. For the MR reference specimens, the spacing from the axis of rotation is preferably taken to mean a focal point of the MR reference specimens or geometric center of the MR reference specimens from the axis of rotation. The MR reference specimens can have different or identical specimen spacings ri from the axis of rotation. A rotation or a swiveling of the shaft about the axis of rotation thus generates a rotation or swiveling of the MR reference specimens along an arc about the axis of rotation with a radius ri.

The shim apparatus comprises a drive unit, with the drive unit forming a pneumatic or an electromagnetic drive and/or motor. The drive unit is preferably arranged at or on the base section of the frame. Alternatively, the drive unit can be arranged, for example, at the height of the axis of rotation or between the axis of rotation and base section. The drive unit can also be arranged internally, in particular between the side walls of the frame, or externally. Furthermore, the drive unit is non-displaceably connected to the frame. The drive unit is designed to output a torque. The drive unit has for this purpose, for example, a motor axis of rotation or defines this. The torque is output to and/or with respect to the motor axis of rotation. In particular, the drive unit forms a step motor. The drive unit can form a drive unit that can be regulated and/or controlled, with it being possible to regulate, set and/or control, for example, the size of the torque to be output and/or an angular increment.

Furthermore, the shim apparatus comprises a gear unit. The gear unit produces an operative connection between the drive unit and the shaft. The gear unit is designed to transfer the torque of the drive unit to the shaft, in particular such that the torque of the drive unit swivels or rotates the shaft about the axis of rotation. In particular, the gear unit connects the motor axis of rotation of the drive unit to the shaft. The torque of the drive unit is transferred to the shaft by the gear unit preferably in the ratio 1:1, it being possible for the gear unit to also have a stepping up or stepping down effect as an alternative. The gear unit forms a mechanical gear unit, in particular a pinion gear, a belt drive or a mixed form comprising pinion gear and belt drive.

The torque transferred by the gear unit effects swiveling and/or rotating of the shaft about the axis of rotation and thus also swiveling and/or rotating of the specimen holders, the MR reference specimens and the reference positions about the axis of rotation. With a transfer or transmission in the ratio 1:1, the MR reference specimens and reference positions are swiveled or rotated about the same angular increment as the motor axis of rotation. It is thus possible to rotate, swivel and/or position the MR reference specimens about the axis of rotation on the basis of an actuation of the drive unit and/or the output torque. For example, a desired MR reference specimen can thus be purposefully positioned about the axis of rotation.

For this, the shim apparatus can have a control unit, it being possible for the control unit to be designed, for example, on the basis of software or hardware. The control unit is designed to actuate the drive unit to emit the torque. For example, the control unit can control, set and/or regulate the size of the torque to be output and/or angular increment. In particular, the control unit actuates the drive unit on the basis of a swivel value, with the swivel value describing, for example, a rotation or swiveling of an MR reference specimen that is to be achieved about the axis of rotation. The control unit actuates the drive unit, for example, such that the output torque effects the rotation, swiveling or swivel value to be achieved.

One or more example embodiments of the present invention is based on the consideration of providing a shim apparatus, which is designed for automated and faster ascertainment of the relevant variables for a shim optimization or shim adjustment. The shim apparatus provided by one or more example embodiments of the present invention is also characterized by a more compact construction, which is enabled, in particular, in that, unlike previously, rods and/or protruding manipulators for manual movement of a specimen wheel do not have to be provided. By using the drive unit, which can be purposefully actuated, in particular by way of a control unit, MR reference specimens can be purposefully positioned at a desired location in the patient tunnel.

The specimen holder is, in particular, planar in design. The specimen holder has, for example, a planar extension of at least 10 cm$^2$. The specimen holder can form a flat surface or a curved surface. The specimen holder, or its planar extension, defines a specimen holder plane. The specimen holder is designed, for example, as a flat component part. For example, the specimen holder has a material thickness of at least 1 mm and preferably less than 3 cm. In particular, the specimen holder forms a circular disk or a polygon. In particular, the axis of rotation or the shaft is perpendicular to the specimen holder plane. In the case of a curved planar specimen holder, the axis of rotation or shaft is perpendicular to a tangential plane at the intersection of the axis of rotation with the specimen holder. Optionally, the specimen holder has rotational symmetry, with the rotational symmetry being given with respect to the shaft or axis of rotation. The MR reference specimens or the reference positions have a spacing ri from the axis of rotation or shaft. By way of the non-rotational connection of the shaft to the specimen holder, a rotation of the shaft effects a rotation or swiveling of the MR reference specimens or reference positions. Use of a specimen holder like this guarantees the required stability in relation to precise positioning of the MR reference specimens when using the shim apparatus. For example, the specimen holder forms a copper disk, an aluminum disk or a disk made of a rigid plastic. The MR reference specimens can be arranged, for example, in recesses of the specimen holders or be attached to the specimen holder with a material-fit connection, with a positive fit or non-positive fit connection. In the case of a specimen holder made of a plastic or composite material, the MR reference specimens can have been integrated, for example integrally cast and/or completely enclosed by the material of the specimen holder, during production of the specimen holder. Undesirable mispositioning and displacement of the MR reference specimens inside the specimen holder is thus ruled out.

One embodiment provides that the gear unit comprises or forms a belt, in particular a toothed belt. The belt or the toothed belt connects the drive unit, for example a motor axis of rotation, to the shaft. For this, the drive unit and the shaft comprises, for example, one toothed wheel or chain wheel each. The toothed belt meshes with the toothed wheel or chain wheel of the drive unit and the shaft. The diameters of the toothed wheels or chain wheels are preferably the same size, so a 1:1 transmission of the torque is achieved. For the case where a step up or step down of the torque is to be achieved, the diameters of the toothed wheels or chain wheels are adjusted to one another accordingly. In particular, it is provided that the belt, in particular the toothed belt, forms a direct connection of drive unit and shaft, with the axis of rotation of the shaft being in the same direction as the motor axis of rotation here. For the case where the motor axis of rotation is not in the same direction as the axis of rotation of the shaft, a deflecting element, or deflection gear, is arranged between shaft and drive unit, which deflects the torque accordingly.

It is particularly preferable that the drive unit forms and/or comprises an electric motor. The electric motor is, in particular, an electric motor for use in an external electric or magnetic field. In particular, the electric motor forms a motor, which is operated on the basis of the external magnetic field. For this, it is provided in particular that the motor axis of rotation is transverse to the preferred direction of the external magnetic field, here the B0 field. For example, the motor axis of rotation is arranged perpendicular to the base section, arranged perpendicular to the shaft and/or forms a linear combination of a vector in the direction of the axis of rotation and the normal in relation to the base section. In particular, the drive unit, especially the electric motor, is designed as described in document DE 10 2020 211 327, the content of which is incorporated by reference hereby.

In particular, it is provided that the gear unit comprises a deflection gear. The deflection gear is designed to deflect the torque of the drive unit into a torque with respect to the axis of rotation of the shaft. For example, the motor axis of rotation is oriented perpendicularly or transversely to the axis of rotation of the shaft, so the deflection gear thus deflects the torque accordingly. The deflection gear is arranged between shaft and drive unit, in particular it is arranged in an inner area of the frame and/or on the base section of the frame. In particular, the deflection gear forms a 90° deflection gear.

These configurations are based on the consideration of providing a shim apparatus actuated on the basis of an electric motor, which apparatus is MR-compatible and can also be operated in strong external magnetic fields. In particular, one or more example embodiments of the present invention comprises the idea of using the external and strong magnetic field of a magnetic resonance imaging system as a magnetic field for operating an electric motor, thus enabling automatic and controllable rotation of the specimen holder.

The shim apparatus has a working state and a transportation state or can adopt these states. In the working state, the shim apparatus can be used for shim optimization or shim setting. In particular in the working state, the shim apparatus is designed and/or adapted for arrangement, positioning and/or displacement in the magnetic resonance imaging system or in the patient tunnel. In the transportation state, the shim apparatus, in comparison with the working state, is particularly compact and/or protected against external environmental influences, for example against dust, moisture and/or mechanical influences. In particular in the transportation state, the shim apparatus or the specimen holder is enclosed by a housing.

In one embodiment, the shim apparatus, in particular the frame, has a base section and two shoulder sections. The shoulder sections form, in particular, the front and back side walls. The two shoulder sections are spaced apart from one another in the longitudinal direction of the shim apparatus. The shoulder sections can form planar sections, alternatively the shoulder sections form struts and/or grid sections. The shoulder sections are connected to the base section. In the working state, the shoulder sections are preferably perpendicular to the base section. The shoulder sections have in particular, one bearing point respectively, for example comprising a bearing, ball bearing and/or sliding bearing. The shaft is rotatably mounted in the bearing points. The shoulder section is connected to the base section in a swiveling or hinged manner, for example via a joint. The shoulder section can be transferred into the transportation state by swiveling and/or folding about the connecting point or the joint. In the transportation state, the shoulder section is in the same direction as the planar extension of the base section, supported on the base section or countersunk into an indentation of the base section.

The shim apparatus preferably comprises a cover module. The cover module is made or formed, for example, from a light metal, with the frame and/or the shaft, in particular, also being formed or made from the light metal. Alternatively, the cover module is formed from a plastic, preferably a fiber-reinforced or carbon fiber-reinforced plastic. The cover module is designed to surround the specimen holder at least partially in the transportation state. For example, the cover module, together with the base section, forms a transport box for the specimen holder. The cover module can be square-shaped and/or be designed as a box. The cover module is preferably designed and/or adapted to serve as a support for the base section and/or the frame in the working state. In particular, the cover module is designed such that the specimen holder is arranged at a desired height in the patient tunnel when the cover module is used as a support. In particular, the cover module comprises a lifting platform apparatus, hereinafter also called lifting platform for short. The lifting platform apparatus is designed to form an adjustable, in particular height-adjustable, support for the frame in the working state. For example, the setting of the lifting platform apparatus to the height of the specimen wheel in the patient tunnel can be adjusted so the shim apparatus is compatible with magnetic resonance imaging systems of different field strengths and/or with different diameters.

It is particularly preferred that the apparatus is designed to be displaceable along a Z-coordinate axis. In the working state, the Z-coordinate axis points along the B0-field, along or through the patient tunnel. In particular, the apparatus is displaceable in the working state in the direction of and counter to the direction of the preferred direction of the B0 magnetic field. The displacement during the working state takes place, in particular, at a constant height, with a constant height being taken to mean a uniform height across the ground. In other words, the apparatus is displaceable inside the patient tunnel, in particular into it and out of it. The shim apparatus, in particular the specimen holder, can be positioned in the isocenter of the magnetic resonance imaging system by the displacement. The shim apparatus can comprise an evaluation unit, for example as part of the control unit.

The shim apparatus comprises at least one magnetic field sensor. The magnetic field sensor is designed, for example, as a Hall effect sensor. In particular, the shim apparatus comprises at least two or at least five magnetic field sensors. The magnetic field sensor has a fixed spacing, also called a fixed relative position, from the specimen holder. The fixed relative position or spacing refers, in particular, to the center of the specimen holder. In particular, the magnetic field sensor is spaced apart from the specimen holder by at least 50 cm. The shim apparatus has for this purpose preferably an arm, with the arm being in the same direction as the axis of rotation. The arm is preferably rod-shaped and/or forms a continuation of the shaft. The arm can be, for example, folded and/or extended, so in the working state it spaces the magnetic field sensor further apart from the specimen holder than in the transportation state.

The magnetic field sensors are designed to ascertain and/or measure a field strength of the magnetic field of the MR apparatus. By using a plurality of magnetic field sensors it is possible, in particular, to ascertain and/or measure a curve of the magnetic field. In particular, the value and/or the direction of the B0 field is ascertained and/or measured by the magnetic field sensors. The evaluation unit is designed to determine, on the basis of the ascertained magnetic field and/or the curve of the magnetic fields, an offset between specimen holder and center, in particular isocenter, of the MR apparatus.

The shim apparatus comprises, in particular, a feedback unit. The feedback unit is provided with the ascertained and/or determined offset. The feedback unit is designed and/or adapted to output and/or display the offset, in particular size information and/or direction information relating to the offset. For example, the feedback unit is designed for optical output and/or display of the offset, for example in the form of the display of a direction, for example arrows and/or distance measurement, for example centimeters or millimeters. Alternatively and/or in addition, the feedback unit can display the offset, the size information and/or direction information via light sources, for example LEDs in different colors and/or by way of different light intensities. In particular, the feedback unit is designed for acoustic output and/or description of the offset, the size information and/or direction information, for example to describe the spacing or offset by outputting a sound at different volumes and/or frequencies. In particular, the feedback unit can form a speech output.

One embodiment provides that the specimen holder comprises and/or has a magnetic field sensor. The specimen holder can have a plurality of magnetic field sensors. The magnetic field sensor(s) are arranged, in particular, in a central region of the specimen holder or are distributed over the specimen holder. The magnetic field sensors are designed to ascertain and/or determine a magnetic field in the region of the specimen holder, in particular the B0 field. The control unit is provided with the ascertained magnetic fields in the region of the specimen holder. The control unit is designed and/or adapted to ascertain and/or determine an actuation value. The actuation value is designed and/or adapted to describe how large the torque to be output should be in order to generate a corresponding rotation of the specimen holder or the MR reference specimen. The control unit actuates the drive unit on the basis of the actuation value. For example, the control unit decides whether the MR apparatus forms a =<3 tesla or a >=6 tesla MR apparatus, with a stronger actuation and/or a greater torque to be output for the latter MR apparatus than for the MR apparatus having lower field strength. Preferably, the shim apparatus comprises an encoder unit, which is designed to ascertain an angular position, in particular an angular position of the specimen holder, the shaft or the motor axis of rotation. The encoder unit can ascertain which MR reference specimen is located at which position or setting, for example which MR reference specimen is positioned at the top, bottom, on the right or left. The control unit is designed and/or adapted to actuate the drive unit on the basis of the ascertained angular position. For example, a desired MR reference specimen can thus be positioned at a desired position in the MR apparatus, for example at the top or bottom. Furthermore, over-rotation of the specimen holder and/or the drive unit can be avoided on the basis of the ascertained angular position.

Particularly preferably, the shim apparatus comprises a locking facility. The locking facility comprises locking pins, which can latch in locking recesses. For this, the specimen holder has locking recesses, which can be designed as blind holes or as complete openings. The locking recesses are arranged, in particular uniformly, in particular in the circumferential direction about the axis of rotation. In order to lock the specimen holder, in particular in order to fix an MR reference specimen in a desired position, the locking pin latches in one of the locking recesses. To be able to rotate the specimen holder further, the locking pin has to be actively pulled or removed from the locking recesses, for example by removing an application of force or tensioning a spring, which braces the locking pin against the specimen holder.

A method for operating and/or using the shim apparatus forms a further subject-matter. In the working state, the shim apparatus is positioned in an examination region of the MR apparatus, for example in a patient tunnel of a magnetic resonance imaging system. In particular, for use and/or operation, the shim apparatus is positioned close to a center, in particular isocenter, of a field magnet of the MR apparatus. The shim apparatus is preferably fixed, for example by bracing, in the MR apparatus, in particular in the patient tunnel. Optionally, it is provided that the cover module is arranged under the frame of the shim apparatus, in particular under the base section of the frame, which module comprises, for example, a lifting platform for height adjustment. The control unit of the shim apparatus actuates the drive unit to output a torque, which is transferred from the gear unit to the shaft to rotate and/or swivel the MR reference specimens about the axis of rotation. In particular, the control unit can be designed to position a selected or selectable MR reference specimen from the plurality of MR reference specimens at a particular location on an arc about the axis of rotation and/or at a selected or selectable position. The MR apparatus performs an MR scan and/or MR measurement data capture while the shim apparatus is arranged in the MR apparatus. The shim of the MR apparatus is adjusted and/or optimized on the basis of the MR scan and/or the MR measurement data of the shim apparatus and/or the MR reference specimens.

An MR apparatus, in particular a magnetic resonance imaging system, forms a further subject-matter. The MR apparatus has an examination region, in particular in the form of a patient tunnel. In the working state of the shim apparatus, the apparatus is arranged and/or positioned in the MR apparatus, in the examination region and/or in the patient tunnel. The MR reference specimens are recorded and/or measured by the MR apparatus.

FIG. 1 schematically shows an exemplary embodiment of a shim apparatus 1. The shim apparatus 1 is designed for application in an MR apparatus 2. The shim apparatus 1 can be arranged and/or stably positioned in a patient tunnel 3 of the MR apparatus 2. On application of the shim apparatus 1, the MR apparatus performs an MR scan of the shim apparatus 1 or captures MR measurement data from the shim apparatus 1. The magnet shim of the MR apparatus 2, also called shimming or shim for short, can be set, adjusted and/or optimized on the basis of the MR scan and/or the MR measurement data. Shimming serves for homogenization of the magnetic field in a region to be optimized.

The shim apparatus 1 comprises a frame 4. The frame 4 is preferably made of a light metal. Alternatively, the frame 4 can be made of a plastic, for example of a carbon fiber-reinforced plastic. It is particularly preferable to construct the frame from hollow profiles and/or square tubes.

In the side view the frame 4 has a substantially rectangular form. A side view is, in particular, taken to mean a horizontal view of the frame 4 when the shim apparatus 1 is arranged in the patient tunnel 3 in the working state. The frame 4 comprises a base section 5, which can be designed as a base plate. Furthermore, the frame 4 comprises a front side wall 6a and a back side wall 6b. The front and the back side wall 6a, b are spaced apart in a longitudinal direction. In the working state, the longitudinal direction is arranged in the direction of the Z-axis of the MR apparatus 1. The side walls 6a, 6b define a frame height HR. The side walls 6a, b can be supported on the base section 5 via an angle bracket. The angle bracket has, for example, a triangular shape.

The frame 4 comprises two bearing points 7a, b, with the bearing point 7a being encompassed by the front side wall 6a and the bearing point 7b by the back side wall 7b. The bearing points form or comprise, for example, a ball bearing. The shim apparatus 1 comprises a shaft 8, which is rotatably mounted in the bearing points 7a, b. The rotatably mounted shaft 8 defines an axis of rotation D. The shaft 8 is designed, for example, as a round rod. Preferably, the shaft 8 is made of the same material as the frame 4. The shaft can be made, for example, of a light metal, such as aluminum, or a plastic. The shaft 8 is rigid. Furthermore, the shaft 8 is non-magnetic. The shaft 8 can be secured against slipping out or displacement, for example in the region of the bearing points 7a, b.

The shim apparatus 1 comprises a specimen holder 9. The specimen holder 9 is designed as a circular disk and has a center M and radius R. The axis of rotation D and the shaft 8 run through the center M. The shaft 8 and the specimen holder 9 are non-rotatably connected, for example welded or glued. The disk-shaped specimen holder 9 is flat and preferably has a material thickness or thickness between 5 mm and 5 cm. The specimen holder 9 is formed from a non-magnetic material, preferably from copper or a fiber-reinforced plastic. The thickness of the specimen holder 9 is preferably oriented in the direction of the longitudinal extension. The shaft 8 and/or the bearing points 7a, b are arranged so far over the base section 5 that the specimen holder 9 can rotate or swivel about the axis of rotation without abutting or grinding. In other words, the spacing between the bearing points 7a, b and the base section 5 is greater than the radius R of the specimen holder 9.

The specimen holder 9 comprises a plurality of MR reference specimens 10, for example it comprises at least 20 MR reference specimens 10. The MR reference specimens 10 can be sealed and/or protected against moisture and environmental influences, for example in a specimen vessel, for example a tube. The MR reference specimens 10 can form, for example, a liquid, gel, foam or solid, which can be seen and/or detected in a magnetic resonance imaging system in a manner similar to human tissue. For example, the MR reference specimens comprise MR-active and/or MR-detectable salts. In particular, the MR reference specimens 10 of the specimen holder 9 have different MR activities, volumes or forms. A different MR activity is taken to mean, for example, a different concentration of a salt, a different water content, a different fat content and/or different MR visibility.

The MR reference specimens 10 are arranged at reference positions 11 on or in the specimen holder 9. The reference positions 11 are given in the case of extended MR reference specimens 10 for example by the focal point or center of the MR reference specimen 10. The reference positions 11 can be fixed, in particular, by recesses and/or fastening elements (for example brackets) to the specimen holder 9, so the MR reference specimens 10 can be exchanged and/or replaced. The MR reference specimens 10 or the reference positions 11 are arranged in the surface of the specimen holder. Preferably, the MR reference specimens 10 or the reference positions 11 are distributed equidistantly or at regular intervals. The MR reference specimens 10 or the reference positions 11 are arranged distributed around the center M, in particular about the axis of rotation D. In the present example, the MR reference specimens 10 or the reference positions 11 are arranged along a circle having radius ri, so all MR reference specimens 10 or the reference positions 11 have the same spacing from the center M. Embodiments are conceivable, however, in which the MR reference specimens 10 or the reference positions 11 have different spacings ri from the center M.

A rotation of the shaft 8 effects a rotation of the specimen holder 9 about the axis of rotation D or the center M. The rotation of the shaft effects a rotation or swiveling of the MR reference specimens 10 or the reference positions 11 about the axis of rotation D or the center M. The rotation or swiveling of the MR reference specimens 10 or the reference positions 11 can thus move an MR reference specimen 10 along the circular path about M having radius ri and thus bring it into a desired position or into a desired location. In other words, for example an MR reference specimen at the bottom can thus be brought into a top position or location, for example into a focal point of the MR apparatus 2 or the center of the patient tunnel 3.

The shim apparatus 1 comprises a drive unit 12. In this exemplary embodiment, the drive unit 12 forms an electrical drive unit 12, it being possible for the drive unit to also be designed as a pneumatic drive unit 12. The electric or pneumatic drive unit 12 preferably forms a step motor. The electrical drive unit 12 is designed as an electric motor, which is suitable for operation in an external magnetic field and is operated, in particular, on the basis of and/or utilizing the external magnetic field. For example, the B0 field of the MR apparatus 2 can be used here. The drive unit 12 has a motor axis of rotation 13, for example in the form of a shaft or axis. The motor axis of rotation 13 forms an output of the drive unit 12. Furthermore, the drive unit has an input 14, with the input 14 being connected to a control unit 15. The control unit 15 is designed for actuation and/or regulation of the drive unit 12. The control unit 15 has a data link to a host 16, with this link being designed, for example, as a radio link. The connection of the input 14 to the control unit 15 is preferably wired, in particular to avoid interactions with the electromagnetic fields of the MR apparatus 1.

The drive unit 12 is designed to output a torque at the motor axis of rotation 13. The value and/or the direction of the torque of the drive unit can be set via the drive unit and/or the control unit. For example, the direction of the torque can be set to "forwards" and "backwards". The size or strength of the torque is varied, for example, as a function of the external magnetic field since greater counterforces prevail for a movement in a 7 T magnetic resonance imaging system than at a lower field strengths. In this exemplary embodiment, the motor axis of rotation 13 is perpendicular to the base section 5 and/or perpendicular to the shaft 8.

To convert and transfer the torque of the drive unit 12 to the motor axis of rotation perpendicular to the shaft 8 into a torque for the shaft or about the axis of rotation D, the shim apparatus 1 comprises a gear unit 17. The gear unit 17 comprises a 90° deflection gear 18 and a toothed belt 19. The 90° deflection gear 18 is designed to align the direction of the reference axis of the torque with the axis of rotation. For this, the 90° deflection gear 18 comprises, for example, two meshing toothed wheels. The 90° deflection gear 18 has an output axis 20. The output axis 20 is in the same direction as and/or parallel to the shaft 8 and the axis of rotation D. The shaft 8 and the output axis 20 each have a toothed wheel, with the toothed belt meshing with the toothed wheels and thus connecting the output axis 20 to the shaft 8. Drive unit 12, gear unit 17, 90° deflection gear 18, toothed belt 19 and/or shaft 8 thus form a kinematic chain.

The torque output by the drive unit 12 or the output rotary movement is transferred to the shaft via the gear unit 17, so the shaft 8 is loaded with a torque and is rotated about the axis of rotation. This rotation effects a rotation and/or swiveling of the specimen holder 9 and the MR reference specimens 10. The drive unit can thus be actuated by the control unit 15 such that the specimen holder 9 is rotated and/or swiveled about a desired value, for example angle of rotation.

This embodiment allows the construction or the shim apparatus 1 to be significantly more compact since the need for additional mechanical stability with manual rotation and locking and the need for fixing with a screw against the ceiling of the patient tunnel 3 can be omitted.

The described shim apparatus 1 comprises a cover module 21. On non-use, transportation and/or storage of the shim apparatus 1, in particular in the transportation state, the cover module forms a cover for the specimen holder 9. For this, the cover module 21 has in a plan view from above a slightly larger extension than the base section 5, so the base section fits in it. The cover module 21 is designed, in particular, to receive the frame 4, the shaft 8 and the specimen holder 9 in the transportation state. The cover module 21 is formed from light materials and in the transportation state serves as transport protection in that the cover module 21 receives and/or protects the base section 5 at least on one side.

Furthermore, the cover module can be designed for adjusting the height of the shim apparatus in the working state, so the shim apparatus can be used for MR apparatuses 2 with different patient tunnel diameters. For example, the shim apparatus 1 is designed such that it fits without cover module as a support in a 60 cm patient tunnel 3 and with turned cover module 21 can be used as a support for the base section 5 and the frame 4 in a 70 cm patient tunnel 3. For this, the cover module 21 only has to be turned and the frame 4 with the base section 5 placed thereon before the entire construction is thus pushed into the patient tunnel 3. In addition, the cover module can have, for example on the side, a lifting platform 22 (FIG. 5) whose height can be manually changed. A lifting platform 22 having two lockable positions is sufficient for this purpose, for example position 1 for 70 cm patient tunnel 3 and position 2 for 80 cm patient tunnel 3.

Furthermore, the shim apparatus 1 comprises at least one magnetic field sensor 23. The magnetic field sensor 23 is arranged on an arm 24, with the arm 24 being connected to the frame 4. The arm 24 forms, for example, a continuation or elongation of the shaft 8 and/or the axis of rotation D. The arm 24 is preferably extendible or can be folded out. The at least one magnetic field sensor 23 is attached at a free end of the arm 24. The magnetic field sensor 23 is designed as a 3D Hall effect sensor. The magnetic field sensor 23 is arranged in the folded-out and/or extended state of the arm 24 in a fixed, specified and/or characteristic spacing d, with the spacing d from the center M to the position of the magnetic field sensor 23 being measured. The characteristic spacing d is a characteristic spacing of a magnetic field, the B0-field and/or the MR apparatus, which describes the spacing of the isocenter of the MR apparatus from a B0 sweet spot of a magnetic field. The magnetic field sensor 23 is arranged on the arm 24 such that in the folded-out or extended state of the arm 24 it is located in what is known as a B0 sweet spot when the specimen holder 9 is placed in the isocenter of the B0 field magnet. The isocenter should in particular be taken to mean the center of a magnetic field, in particular the origin of the coordinate system (x, y, z)=(0, 0, 0). In the case of a magnet having a cylindrical hollow, the magnetic focal point or the isocenter is located in the center of the hole. The B0 sweet spot is, for example, a location at which the B0 field has a predefinable or specified value between 20% and 80% of the B0 field. In particular, the described B0 sweet spot corresponds to the location of the characteristic magnetic field strength Bref from DE 10 2016 203 255 A1, with reference being made to the content of this patent for further details.

The control unit 15 is provided with the measured magnetic field by the at least one magnetic field sensor 23. An evaluation unit, for example as part of the control unit 15, ascertains an offset V on the basis of the measured magnetic field. A service technician can be assisted in centering the shim apparatus 1 by the provision of the ascertained offset V in that the evaluation unit calculates the Z-position of the shim apparatus 1 from the B0 profile and this is displayed to the service technician. For this, the Z-position of the magnetic field sensor 23 is determined, hereinafter this will also be referred to as zS, on the basis of the measured magnetic field. The evaluation unit is provided with or stores the fixed spacing d of the magnetic field sensor 23 from the specimen holder 9 in the extended and/or folded-out state of the arm 24. From this information the evaluation unit ascertains the offset V via the relationship:

$$V = zS - d$$

The offset V is communicated, for example visually, via speech/sound and/or or vibration, to the service technician via an output unit. For the visual display, for example one or more LED(s) can signal the correct position by way of light (for example by RYB colors: green=ok, red=incorrect direction, yellow=correct direction). Particularly advantageously, offset V, the position and the direction can be represented as numerical values on a small LCD/OLED monitor 25 directly in the field of vision of the service technician, so when centering the shim apparatus 1 he receives immediate feedback on the current position and knows very precisely what he should be doing next. For example, the service technician is shown the offset V of 1.5 mm as the following text "Please move device 1.5 mm to Head" on the monitor 25. The service technician has to change the position of the shim apparatus 1 until offset=0 is displayed. The position zS of the magnetic field sensor 23 is continuously automatically updated in the process.

Because, in general, the center of the magnet and the center of the gradient system do not exactly match, the current position of the shim apparatus 1 still does not exactly match the isocenter. The Z-coordinates zP of the MR reference specimens having Z-gradient is also measured, therefore. This provides an offset O between the current center of the magnet and the isocenter. The offset V is then determined as $$V = zS - d - O.$$

Furthermore, the specimen holder 9 comprises a further magnetic field sensor, with this preferably being arranged in or around the center M. The value of the homogeneous magnetic field of the MR apparatus 2 can be measured with this magnetic field sensor, with the control unit 15 being provided with the measuring result. The control unit 15 ascertains on the basis of the measuring result which kind of MR apparatus 1 is involved, for example whether it is a 0.55T, 1.5T, 3T or 7T magnet. This information is used by the control unit 15 to adjust/scale the current strength of the drive unit 12 such that the maximum torque has the same value independently of the current field strength of the magnet. Furthermore, on the basis of this information the control unit 15 can calculate the position of the B0 sweet spot dependent on the magnet type. As an alternative to the magnetic field sensor in the specimen holder 9, the value of the frequency adjustment of the MR reference specimens 10 can also be converted into a B0 flux density and used (B0_T=Fre_1H_Hz/γ).

Furthermore, the shim apparatus 1 comprises an encoder as an encoder unit 26, which is designed to acquire the current angular position of the specimen holder 9. For this purpose, a 3D Hall effect sensor can advantageously likewise be used from whose B0 measurement data (Bx, By, Bz) the current angle of rotation α can be calculated via α=atan 2(Bx/By). Other encoders, such as simple optical encoders or tilt sensors/acceleration sensors, for example, are also conceivable, however, because the demands on the angular resolution of the encoder tend to be low (for example 360°/20 steps=18°). The exact angular position is not achieved as is otherwise customary by way of a closed-loop regulation but by a mechanical locking facility 27. Using the angle information from the encoder it is possible to ensure that a coil cable 28 between a coil connector 29 and a multiplexer 30 is never over-rotated with automatic rotation. This information can also be used to decide which MR reference specimen 10 will be approached next with automatic rotation of the specimen holder 9.

Preferably, all necessary RF shields, such as the housing of the multiplexer 30, are not constructed as previously customary from sheet aluminum but from carbon fiber-reinforced plastic (CFRP). This material provides sufficient RF damping and has the great advantage that no eddy currents are induced in it on a movement of the shim apparatus in the MR apparatus 2 and consequently the movement of the shim apparatus is not decelerated during centering. Advantageously, parts, in particular edges, of the RF shields with a nonmagnetic metal (for example copper) are electroplated. The RF shield is connected to the back of the multiplexer 30 either by soldering or gluing with an electrically conductive adhesive (FIG. 6).

The locking facility 27 is designed to exert a holding moment on the specimen holder 9 to thus fix the specimen holder 9 or the MR reference specimen 10 in position. If this holding moment is exceeded by an external force or torque of the specimen holder 9, the locking yields and allows the specimen holder to be rotated further by one position and it is then automatically locked in this position.

Figure 3A:
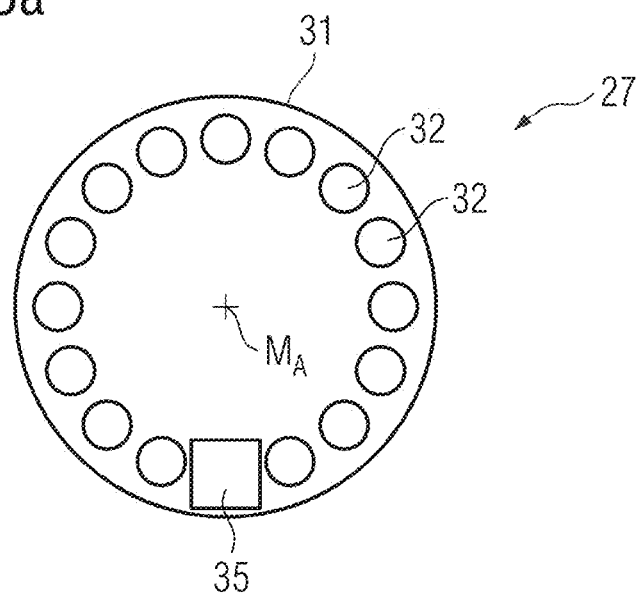
FIGS. 3a, b show an exemplary embodiment of a locking facility.

Reference is made to FIGS. 3*a, b* for details on the locking facility 27. The locking facility 27 comprises a locking pin 31, which can itself latch in locking recesses 32 in the specimen holder 9 or a ball 33, which is arranged between locking pin 31 and specimen holder 9, can lock. The locking pin 31, and therewith the ball 33, is loaded with a force to hold the locking pin 31 and/or the ball 33 in the locking recess 32 and thus apply the holding moment. For applying a force the locking facility 27 comprises a spring 34. The spring 34 can, in particular, be part of the locking pin 31, so the locking pin 31 is flexible. The balls 33 can be constructed from plastic or ceramic. The spring 34 and/or the locking pin 31 can be constructed from a nonmagnetic metal, for example phosphor bronze, or from plastic. In particular, the locking facility 27 comprises a setting screw 35 with which the holding moment and the force for application to the ball can be changed in that the spring 34 is either pretensioned or released.

FIGS. 2a, b, c and d show the shim apparatus 1 from FIG. 1 in a view along the longitudinal axis or the shaft 8. FIG. 2a shows the shim apparatus 1 in a working state. The front side wall 6a shown is congruent with the back side wall 6b in this view. The front side wall 6a, in particular also the back side wall 6b, form a shoulder section 36. The shoulder sections 36 each comprise a first shoulder arm 37a and a second shoulder arm 37b. The shoulder arms 37a, b of a shoulder section are connected in a connecting point 38 so they can twist and/or pivot relative to one another. For example, by rotation about the pivot point 38 the second shoulder arm 37b can be caused to be congruent with the first shoulder arm 37a.

Each of the two shoulder sections 36 comprises one of the bearing points 7a, b respectively. The bearing points 7a, b coincide with the pivot point 38 here. In other words, the shaft 8 connects the two shoulder sections 36, with the axis of rotation D of the shaft 8 and of the specimen holder 9 running through the pivot points 38 of the two shoulder sections 36.

The shoulder arm 37a is connected to the base section 5 at a folding point 39a. The shoulder arm 37a can rotate, swivel and/or hinge around the folding point 39a. The connection at the folding point 39a forms a fixed and/or permanent connection. The shoulder arm 37b is connected to the base section 5 at a folding point 39b. The shoulder arm 37b can be mounted to swivel at the folding point 39b. Preferably, the folding point 39b forms a support point for deriving a force imparted by the shoulder arm 37b. The connection at the folding point 39b forms a detachable connection, wherein in the working state, the shoulder arm 37b is connected to or fixed on the base section 5 at the folding point 39b. In the transportation state, the connection at the folding point 39b is released and the shoulder arm 37b is not fixed to the base section 5.

In the working state, the shoulder section 36 has a triangular shape having the pivot point D, the folding point 39a and the folding point 39b as corner points. The two shoulder arms 37a, b form two sides of the triangle. In the working state, the shaft 8 and the specimen holder 9 are mounted by way of the shoulder arms, in particular the triangular shape thereof, stably in the pivot point D and are supported at the base section 5 by way of the folding points 39a, b.

FIG. 2b shows a transition state of the shim apparatus 1. The connection of the second shoulder arm 37b at the folding point 39b is released to bring the shim apparatus 1 into the transportation state. The second shoulder arm 39b can then be rotated about the pivot point D, in particular until first and second shoulder arms 37a, b overlap in the viewing direction of the axis of rotation or are in the same direction. The connection of the second shoulder arm 37b at the folding point 39b is still provided.

Figure 2C:
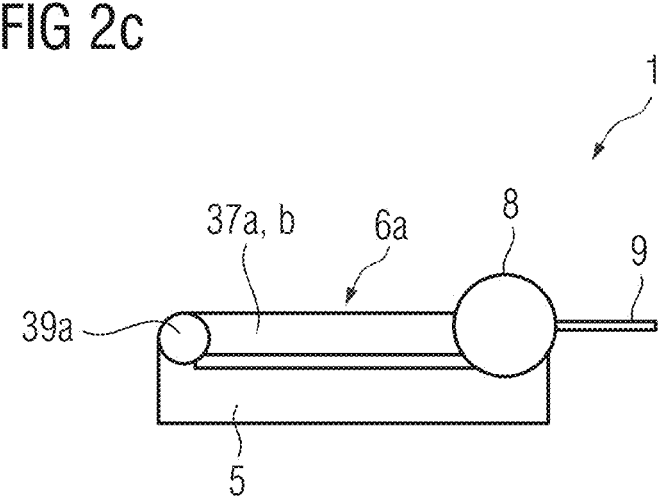
FIGS. 2a, b, c, d show front views of the shim apparatus according to one or more example embodiments of the present invention.

FIG. 2c shows the shim apparatus 1 without cover module 21 in the transportation state. For this, the shoulder section 36, in particular the two shoulder arms 37a, b, is rotated further about the folding point 39a until they are in the same direction as the base section 5. In the transportation state, the shoulder arms 37a, b rest on the base section 5. Alternatively, the base section 5 can have indentations for receiving the shoulder arms 37a, b, the shaft 8 and the specimen holder 9.

Figure 2D:
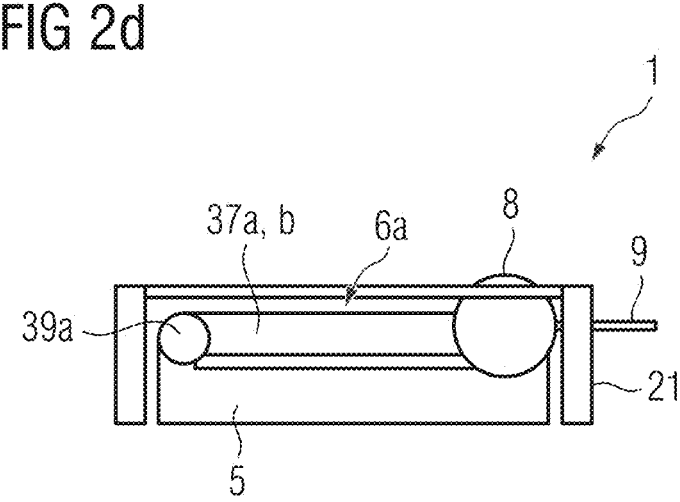

FIG. 2d shows the shim apparatus 1 in the transportation state, in particular as in FIG. 2c, with the shoulder sections 36, the shaft 8 and the specimen holder 9 being covered by the cover module 21. Together with the base section 5 the cover module 21 forms a housing for the shaft 8 and the specimen holder 9, with the cover module 21 at least partially receiving and/or surrounding the base section.

Figure 3B:
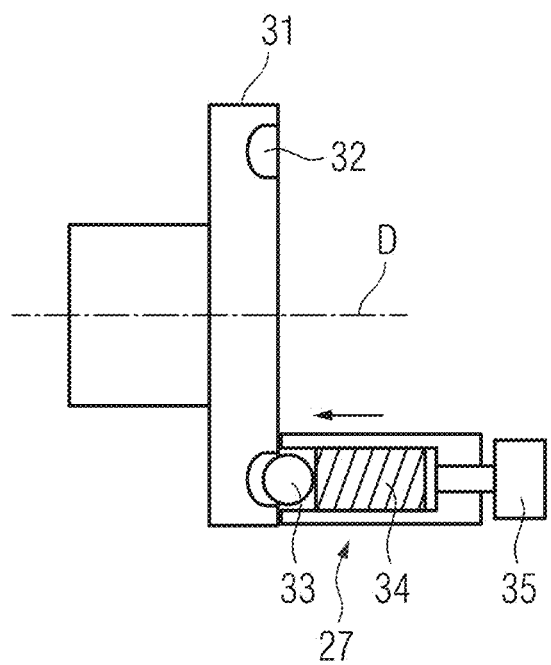

FIGS. 3a and 3b show an exemplary embodiment of a locking facility 27. FIG. 3a shows the specimen holder 9 of the shim apparatus 1 in a view along the shaft 8 or the axis of rotation D, in particular from the back side wall 6b to the front side wall 6a. Locking recesses 32 are arranged around the center M of the disk-shaped specimen holder 9. The locking recesses 32 are designed as blind holes and are arranged at regular intervals in the circumferential direction with a fixed spacing from the center M. Preferably, the positions of the locking recesses 32 match the reference positions 11, with the reference positions 11, or MR reference specimens 10 being located on the opposing side of the specimen holder 9.

FIG. 3b shows a side view of the specimen holder 9 and the locking facility 27. The longitudinal extension of the locking pin 31 is in the same direction as the axis of rotation D. The locking pin 31 and the spring 34 are arranged such that they press the ball 33 into the locking recess 32. The diameter of the ball 33 and the depth of the locking recesses 32 are coordinated such that the ball projects only partially into the locking recess 32 and the part of the ball 33 protruding from the locking recess 32 locks and/or fixes the specimen holder in the corresponding position. To rotate the specimen holder 9 further the holding moment has to be overcome and the spring 24 tensioned to such an extent that the ball 33 slides out of the locking recess 32, it being possible for the sliding of the ball 33 from the locking recess to be promoted by a guide and/or conical shape of the locking recess 32.

Figure 4:
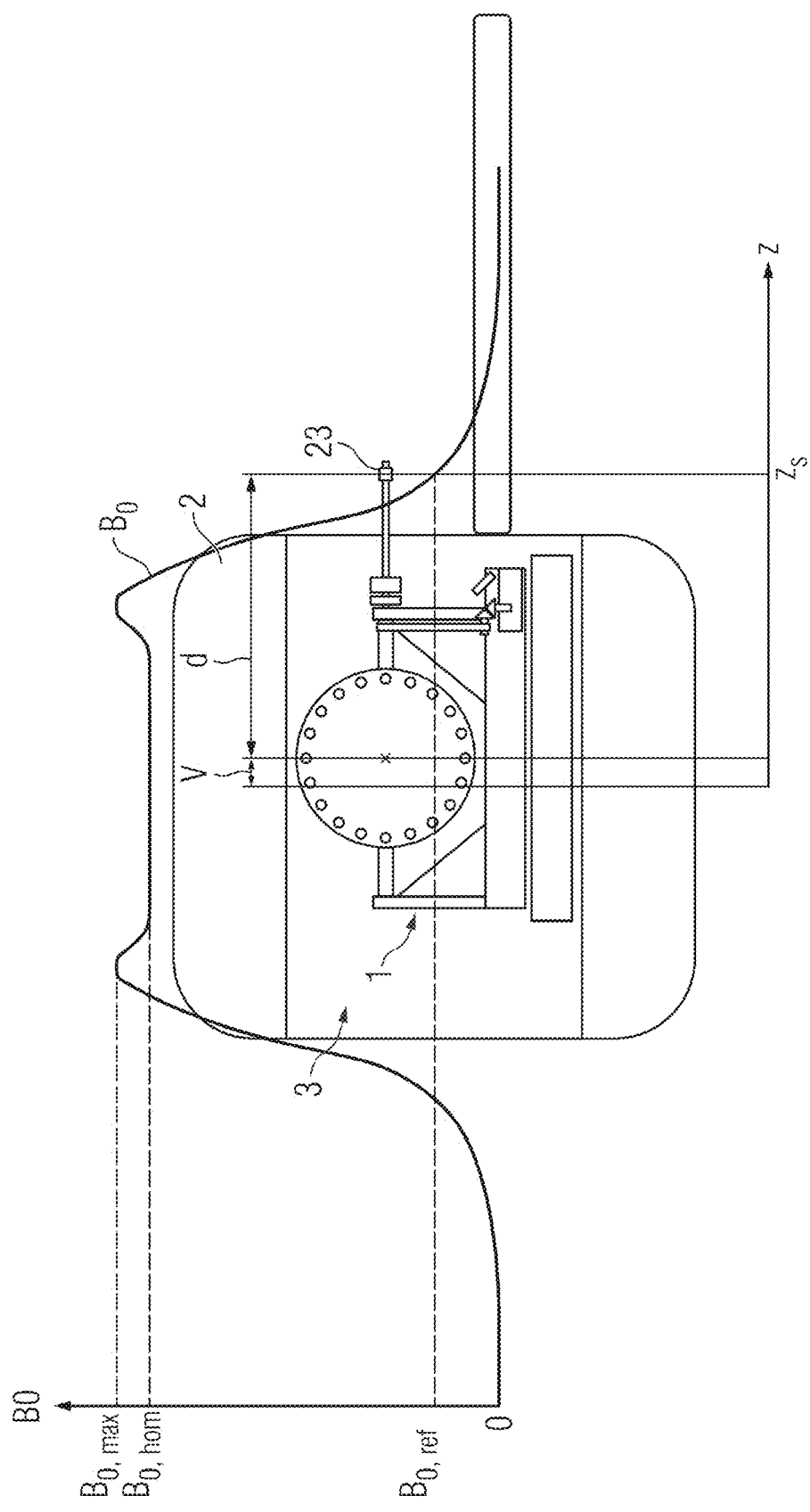
FIG. 4 shows a side view of an MR apparatus having characteristic magnetic field curve according to one or more example embodiments of the present invention.

FIG. 4 shows a section through an MR apparatus 2, which is designed as a magnetic resonance imaging system. The MR apparatus 2 has a patient tunnel 3, which extends in a Z-direction. The shim apparatus 1 is arranged in the patient tunnel 3 and is in the working state. Furthermore, the curve of the value of the B0 field for different Z-positions, in particular in the patient tunnel 3i, is schematically outlined in FIG. 4. In a region around the center of the patient tunnel 3, the B0 field is homogeneous and has the field strength B0,hom. At the edges of the patient tunnel 3 the field strength is B0,max, which is greater than B0,hom. From there the field strength drops from the value B0,max with increasing spacing from the MR apparatus 2. This profile, which can also be referred to as M-shaped, describes the characteristic magnetic field curve of the MR apparatus. The Z-regions, at which the B0 field and/or its field strength is between 20% and 80% of B0,hom, are referred to as characteristic regions, which comprise, in particular, the position B0,ref, which is assumed to be 0.3*B0,ref here.

The magnetic field sensor 23 measures the field strength or the magnetic field B0 at its position, or for its Z-position. On the basis of the measured magnetic field, for example 0,27*B0,hom at the Z-position of the magnetic field sensor 23, the evaluation unit and/or the control unit 15 can ascertain the current Z-position of the magnetic field sensor 23 on the basis of the characteristic curve. The ascertained position is conducted as zS. On the basis of zS and the known spacing d between magnetic field sensor 23 and center M of the specimen holder 9, the evaluation unit and/or the control unit 15 ascertains the offset V as: V=|zS|−d FIG. 5a shows the cover module 21 when it is in the transportation state. FIG. 5b shows the cover module 21 comprising a lifting platform 40. The lifting platform 40 comprises two struts 41a, b, which are connected by a rotary joint 42. The lifting platform 40 can assume two extended positions. FIG. 5a shows the cover module 21 in the first extended position. The cover module 21 comprises two flat plates 45. The struts 41a, b are rotatably connected at the point 43 to one plate 45 respectively. The opposing end of the struts 41a, b is connected at point 44 to the other plate 45 respectively, so each strut 41a, b connects the two plates 45 and a cruciform strut section results. Located further inwards, or close to point 43, the plates 45 comprise a point 46. If the struts 41a, b are connected to the plates 45 at point 47 instead of at point 46, the lifting platform assumes the second position, which corresponds to a larger lifting platform or one that is extended further (FIG. 5c).

FIG. 6a shows an example of an RF shield 48. The RF shield 48 forms a screen for the multiplexer 30. The multiplexer 30 comprises a back wall 49. A board 50, for example in the form of a printed circuit board (PCB), is arranged on the back wall 49. Furthermore, the RF shield 48 has a metallized edge 51, which encircles the board 50. Electronic components, for example filter capacitors 52, for example for VCC and ground, and optocoupler 53 for data lines are arranged at the metallized edge 51. The edge 51 can establish contact with the board 50 here. The RF shield is preferably designed such that it surrounds the board 50 and some of the edge 51, but leaves some of the edge 51 open and/or does not screen it (FIG. 6b).

Figure 7:
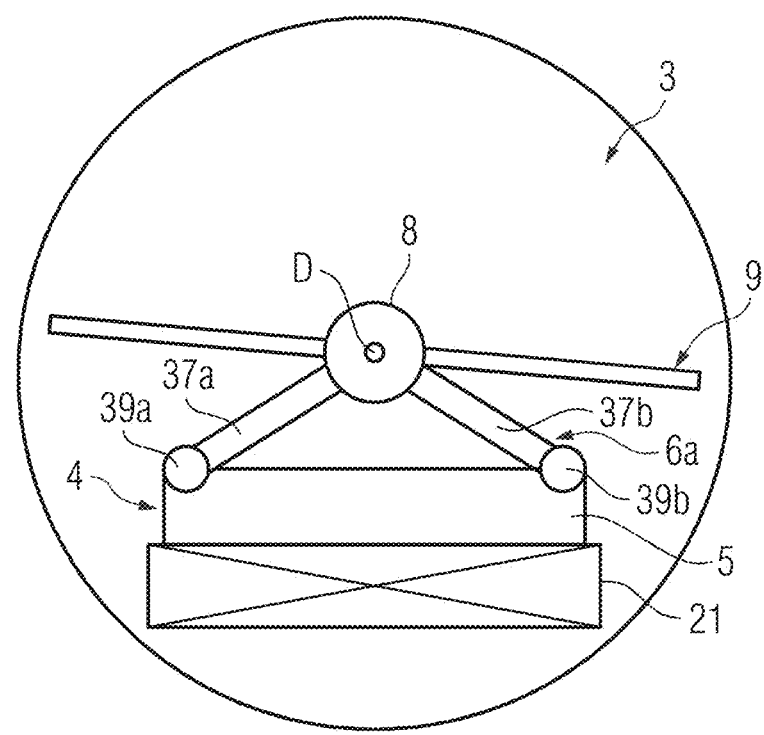
FIG. 7 shows an MR apparatus having the shim apparatus according to one or more example embodiments of the present invention.

FIG. 7 shows the shim apparatus 1 having the cover module 21 in the working state, which is arranged in the patient tunnel 3. The cover module 21 is supported in the circular patient tunnel 3 and can thus form a stable support for the base section 5, the frame 4, the shaft 8 and the specimen holder 9. In particular, the cover module 21 and/or the lifting platform 40 is designed such that in the working state, the axis of rotation D and/or the shaft 8 are located in the center or center of the circular patient tunnel 3.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SOC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module', 'interface' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium, storage means or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Wherever meaningful, individual embodiments or their individual aspects and features can be combined or exchanged with one another without limiting or widening the scope of the present invention. Advantages which are described with respect to one embodiment of the present invention are, wherever applicable, also advantageous to other embodiments of the present invention.

The invention claimed is:

1. A shim apparatus for an MR apparatus, comprising:
a specimen holder, the specimen holder including a plurality of MR reference specimens, the MR reference specimens being on the specimen holder;
a frame;
a shaft, the shaft being mounted on the frame such that the shaft is rotatable about an axis of rotation, the specimen holder being non-rotatably connected to the shaft, the MR reference specimens being spaced apart from the axis of rotation;
a drive unit, the drive unit being configured to output a torque, the drive unit being electrical or pneumatic; and
a gear unit, the gear unit being configured to transfer the torque output by the drive unit to the shaft and to rotate or swivel the MR reference specimens about the axis of rotation, wherein
the frame has a base section and two shoulder sections, the shoulder sections each have a bearing point, the shaft is rotatably mounted in the bearing points, a working state and a transportation state is assumed by the shim apparatus, the shoulder sections in the working state space the shaft apart from the base section, and at least one of the specimen holder or the shaft are on the base section in the transportation state.

2. The shim apparatus of claim 1, wherein the specimen holder is planar and defines a specimen holder plane, the axis of rotation is perpendicular to the specimen holder plane, the MR reference specimens each have a spacing from the axis of rotation and at least one of rotation or swiveling of the MR reference specimens forms a movement along an arc with a corresponding radius about the axis of rotation, the spacing and the corresponding radius for each reference specimen being the same.

3. The shim apparatus of claim 1, wherein the gear unit comprises,
a toothed belt, wherein the toothed belt connects the drive unit to the shaft for transfer of the torque.

4. The shim apparatus of claim 1, wherein the drive unit comprises,
an electric motor, wherein the electric motor is configured to operate in an external magnetic field and has a motor axis of rotation, wherein the motor axis of rotation is transverse to the axis of rotation of the shaft.

5. The shim apparatus of claim 1, wherein the gear unit comprises,
a deflection gear, wherein the deflection gear is configured to deflect the torque output by the drive unit into a torque about an axis in a same direction as the axis of rotation of the shaft.

6. The shim apparatus of claim 1, wherein the shoulder sections have a first shoulder arm and a second shoulder arm, wherein the first shoulder arm is rotatably connected to the base section at a folding point, the second shoulder arm is connected to the base section at the folding point in the working state and the connection of the second shoulder arm to the base section at the folding point is released in the transportation state.

7. The shim apparatus of claim 1, further comprising:
a cover module, wherein the cover module includes a light metal or a fiber-reinforced plastic and is configured to form a housing section for the specimen holder in the transportation state and form a support for the frame in the working state.

8. The shim apparatus of claim 1, wherein
the shim apparatus is oriented along a Z-coordinate axis in the working state, wherein the Z-coordinate axis is in a same direction as a static magnetic field of the MR apparatus, the shim apparatus comprises,
an evaluation unit, and
a magnetic field sensor at a fixed spacing from the specimen holder, the magnetic field sensor is configured to determine a magnetic field, the evaluation unit is configured to determine, based on the determined magnetic field and a characteristic magnetic field curve of the MR apparatus, an offset between the specimen holder and an isocenter of the MR apparatus.

9. The shim apparatus of claim 8, further comprising:
processing circuitry configured to optically or acoustically output at least one of size information or direction information with respect to the offset.

10. The shim apparatus of claim 1, wherein the specimen holder comprises,
a magnetic field sensor, the magnetic field sensor of the specimen holder is configured to ascertain a magnetic field in a region of the specimen holder, and a control unit is configured to at least one of regulate or control the drive unit based on of the magnetic field in the region of the specimen holder.

11. The shim apparatus of claim 1, further comprising:
an encoder unit, wherein the encoder unit is configured to ascertain an angular position of the specimen holder with respect to the axis of rotation, and a control unit is configured to actuate the drive unit based on the ascertained angular position.

12. The shim apparatus of claim 1, further comprising:
a locking facility having a locking pin, wherein the specimen holder has locking recesses in a circumferential direction around the axis of rotation, and the locking facility is configured to latch the locking pin in the locking recess to lock the specimen holder in a locking position.

13. A method for operating the shim apparatus of claim 1, the method comprising:
assuming the shim apparatus in a working state, the shim apparatus being in a patient tunnel of an MR apparatus;
actuating the drive unit to output the torque, the torque being transferred via the gear unit from the drive unit to the shaft; and
at least one of rotating or swiveling the specimen holder during at least one of (i) operation of the MR apparatus or (ii) during MR scans.

14. An MR apparatus for capturing MR data of a patient, the MR apparatus comprising:
the shim apparatus of claim 1, wherein the shim apparatus is configured to be displaceably in a patient tunnel of the MR apparatus in a direction of a B0 field.

15. The shim apparatus of claim 5, wherein the shoulder sections have a first shoulder arm and a second shoulder arm, wherein the first shoulder arm is rotatably connected to the base section at a folding point, the second shoulder arm is connected to the base section at the folding point in the working state and the connection of the second shoulder arm to the base section at the folding point is released in the transportation state.

16. The shim apparatus of claim 15, further comprising:
a cover module, wherein the cover module includes a light metal or a fiber-reinforced plastic and is configured to form a housing section for the specimen holder in the transportation state and form a support for the frame in the working state.

17. The shim apparatus of claim 16, wherein
the shim apparatus is oriented along a Z-coordinate axis in the working state, wherein the Z-coordinate axis is in a same direction as a static magnetic field of the MR apparatus, the shim apparatus comprises,
an evaluation unit, and
a magnetic field sensor at a fixed spacing from the specimen holder, the magnetic field sensor is configured to determine a magnetic field, the evaluation unit is configured to determine, based on the determined magnetic field and a characteristic magnetic field curve of the MR apparatus, an offset between the specimen holder and an isocenter of the MR apparatus.

18. The shim apparatus of claim 17, further comprising:
processing circuitry configured to optically or acoustically output at least one of size information or direction information with respect to the offset.

* * * * *